United States Patent Office 2,981,719
Patented Apr. 25, 1961

2,981,719

POLYURETHANE PLASTICS

Cornelius Mühlhausen and Kürt Genski, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware No Drawing. Filed July 17, 1957, Ser. No. 672,362

Claims priority, application Germany July 21, 1956

3 Claims. (Cl. 260—75)

This invention relates generally to the manufacture of polyurethane plastics and more particularly to a method for making improved elastomeric polyurethane plastics and to a novel intermediate product useful in the production of elastomeric polyurethanes.

It has been proposed heretofore to prepare rubber-like or elastomeric substantially non-porous polyurethanes by reacting an organic compound having at least two reactive hydrogen atoms and a molecular weight of at least 1000 with a polyisocyanate and a cross-linking agent or chain extender such as for example a glycol or other polyhydric alcohol. In accordance with one of the heretofore disclosed processes, a polyester is reacted with an excess of an organic polyisocyanate over that required to react with all of the hydroxyl groups of the polyester and the resulting prepolymer is reacted with a glycol, diamine or amino alcohol in an amount at least equivalent to the isocyanate groups present in the prepolymer. The resulting product is somewhat similar to a raw rubber sheet and is hereinafter referred to as a "preliminary addition product." This preliminary addition product is mixed with additional polyisocyanate on a suitable roller type mixer such as a rubber mill or a kneader and the resulting mixture may be heated to form any elastomeric polyurethane.

A preliminary addition product prepared by reacting the prepolymer with a diamine or an amino alcohol in accordance with the foregoing process has the undesirable characteristic of reacting too rapidly with the polyisocyanate mixed therewith on the rubber mill to be storable for any appreciable length of time even at room temperature before calendering or extruding. Because of some chemical reaction proceeding substantially immediately upon mixing of the preliminary addition product prepared from a diamine or amino alcohol, the mechanical properties of the mixture are constantly changing which requires constant modification and alteration of the calendering, extruding or other processing to compensate for the changes in the physical characteristics.

The foregoing difficulties can be avoided by using a glycol instead of a diamine or amino alcohol in the preparation of the preliminary addition product and an insoluble or masked isocyanate for example, a dimeric toluylene diisocyanate or a urea diisocyanate, for example bis-4,4'-dimethyl-3,3'-diisocyanato diphenyl urea. Such mixtures are storage stable for as many as fourteen days or more at room temperature, but such a mixture is sensitive to elevated temperatures. Consequently, occasional cracks, or bubbles appear in the final product when it is prepared by heating. Moreover, extreme care must be exercised during the final heat period to produce a suitable product and a long heat period is required. For example, the mold must be at about room temperature (20° C.) or lower at the time the mixture is poured therein and heating can be commenced only after the mold has been closed. The contents of the mold are then heated to about 120° C. and held at that temperature for about 60 minutes, cooled at room temperature and held at that temperature for about 48 hours before reheating to 110° C. where it is maintained for about 24 hours. The mold and its contents must then be cooled to room temperature before the contents can be removed.

It is conventional practice to accelerate the reaction of isocyanate groups with compounds containing reactive hydrogen atoms by adding tertiary amines. The incorporation of such a tertiary amine into the mixture of the preliminary addition product with the polyisocyanate by rolling causes such a considerable acceleration of the reaction at room temperatures that the storability absolutely necessary for series production and thus the reliability in working are not provided. Primary and secondary amines are, on the contrary, completely ineffective as accelerators.

It is therefore an object of this invention to provide a process for making polyurethane plastics devoid of the foregoing disadvantages. Another object of the invention is to provide a method for making polyurethane plastics without extended heat treatment periods and complicated heating processes. Still another object of the invention is to provide a method for making a preliminary addition product which can be stored for an appreciable length of time before it is processed into the final product by heating. A further object of the invention is to provide a novel storable intermediate product adapted to be heated to form an elastomeric polyurethane plastic. A still further object of the invention is to provide an improved process for making elastomeric polyurethane plastics. Another object of the invention is to provide a method for making a mixture of a polyisocyanate and a preliminary addition product which mixture is at least as storable as the heretofore available preliminary addition products produced by reacting a glycol with a prepolymer or a mixture prepared from a preliminary addition product and a dimeric polyisocyanate or urea diisocyanate but devoid of the disadvantages inherent in the heretofore available mixtures of this type.

Generally speaking, the foregoing objects as well as others are accomplished in accordance with this invention by providing a preliminary addition product and organic polyisocyanate mixture containing, in addition, a compound, or mixture of compounds, which upon heating to about 50° C. or higher splits off a free amine. More specifically, the invention provides a method for making elastomeric polyurethanes of high molecular weight by means of a storage stable preliminary addition product whereby the preliminary addition product is mixed with both an organic polyisocyanate and a compound or compounds which upon heating to about 50° C. or higher splits off a free amine and this mixture is then heated while shaping it to the desired configuration to bring about final chemical reaction and curing thereof. The amine obtained by heating the mixture to 50° C. or higher may be a primary, secondary or tertiary amine.

When compounds which split off amines at temperatures of about 50° C. or higher are added to the reaction mixture as provided in accordance with this invention, the technical working conditions as regards storability at room temperature are assured and the heating process is greatly accelerated and simplified. In other words, it is possible by practicing this invention to provide a preliminary addition product which can be stored for several hours without any material change therein due to chemical reaction and, at the same time, the preliminary addition product is adaptable to be finally processed by a heating process which is much simpler than that of the heretofore available storage stable preliminary addition products. It is to be noted particularly that compounds which liberate primary and secondary amines as well as tertiary amines are suitable for use in this invention.

Any suitable compound which upon heating to a temperature of about 50° C. or higher splits off an amine which will accelerate the reaction between the preliminary addition product and the polyisocyanate may be used such as, for example, the heavy metal complexes of any alkyl-substituted pyridine compound including collidine, a fraction of coal tar containing trimethyl and methylethyl pyridines, either trimethyl pyridine or methylethyl pyridine, α-, β- or γ-picoline, α-vinylpyridine, 2-methyl-5-ethyl pyridine, pyridine, quinaldine, acridine, and the like. Any suitable heavy metal salt of these compounds may be used such as, for example, the complexes of pyridine and its derivatives with copper chloride, zinc chloride, lead chloride, ferrous chloride, calcium chloride, cadmium chloride, cobalt chloride, nickel chloride, ferrocyanic acid, or the like. The salts of substituted dithiocarbamic acids, for example, the zinc salt of ethyl phenyl dithiocarbamic acid, dimethyl dithiocarbamic acid or diethyl dithiocarbamic acid may also be used. Additional examples of suitable precursors of amines, i.e., compounds which split off amines upon heating to about 50° C. or higher, include the condensation products of aldehydes with amines or ammonia such as, for example, hexamethylene tetramine.

The degree of acceleration of the reaction resulting in the formation of a high molecular weight elastomeric polyurethane brought about by the presence of the compound which splits off an amine is dependent upon the constitution of the compound employed and the heating period can be further shortened by including a metal oxide along with the amine producing compound. Basic oxides such as lead oxide or zinc oxide accelerate the action of the substance splitting off the amine whereas acid oxides such as titanium dioxide, iron oxide or antimony oxide retard such action. The metal oxides alone, that is without the compound which splits off an amine, are more or less ineffective as accelerators. The effect of the combination of the compound which splits off an amine and the basic oxide of a metal is, however, synergistic.

The heating period may be varied by proper selection of the compound which splits off an amine and the metal oxide. In other words, it is possible to prepare a preliminary addition product-organic polyisocyanate mixture which is adaptable to any of a variety of manufacturing conditions by including the proper compound which splits off an amine. Moreover, the physical characteristics of the elastomeric polyurethane may be controlled to some extent by proper selection of the compound which splits off an amine. Unlike the heretofore available preliminary addition product and polyisocyanate mixtures, the one provided by this invention containing the compound which splits off an amine upon heating to above 50° C. may be placed in a hot mold and the molded product can be removed from the hot mold. In many cases, the heretofore practice of heating at temperatures above 100° C. in the final stage of the process is eliminated. Should it, nevertheless, be desired to heat to 100° C. for some purpose, the heating time can be reduced to a few hours at this temperature.

The preliminary addition product is prepared in conventional manner by reacting any suitable organic compound having reactive hydrogen atoms and preferably a polyhydroxy compound having a molecular weight of at least 1000 with an excess of a diisocyanate and subsequently adding an equivalent quantity or an excess of glycol over that required to react with the isocyanate groups. Any suitable organic compound having at least two reactive hydrogen atoms, such as, for example, a polyester amide, a polyacetal, a linear or predominantly linear polyester, such as can be prepared, for example, by thermal condensation of any suitable polyhydric alcohol, for example, ethylene glycol, diethylene glycol, propylene glycol, 1,3-butylene glycol, 1,4-butylene glycol and a suitable polycarboxylic acid such as for example, succinic acid, adipic acid or phthalic acid and the like may be utilized. Other suitable organic compounds having at least two reactive hydrogen atoms include polyalkylene ether glycols prepared by condensation of ethylene oxide or propylene oxide or tetrahydrofuran polymers, or polythioethers prepared by condensation of diols and thiodiglycols, or those polythioethers which are described in patent application Serial Number 589,586, filed June 6, 1956, by Muller et al., and the like. As pointed out above, these organic compounds having at least two reactive hydrogen atoms should have a mean molecular weight of at least 1000, but preferably from 1500 to 2000, an hydroxyl number from 20 to 112 and an acid number of not more than 2.

Any suitable aliphatic, aromatic or cycloaliphatic polyisocyanate may be used in preparing the prepolymer by reaction with the polyhydroxy compound. Examples of such polyisocyanates are hexamethylene diisocyanate, p-phenylene diisocyanate, cyclohexyl diisocyanate, 1,4- and 1,5-naphthylene diisocyanates and 4,4'-diphenyl dimethane diisocyanate and the like. Diisocyanates with uretidinedione rings, urea, urethane or azo groups in the molecule can also be used.

Any suitable glycol may be used for reacting with the prepolymer such as, for example, ethylene glycol, propylene glycol, 1,3- or 1,4-butylene glycols, trimethylol propane and also glycols with urea, urethane, carbonamide or ester groups. Glycols with aromatic ring systems, for example 1,5 - naphthalene - dihydroxyethyl ether may also be used. Any suitable polyisocyanate may be reacted with the preliminary addition product but organic diisocyanates containing uretidinedione rings or urea groups are preferably used. For example, dimeric toluylene diisocyanate or bis-4,4'-dimethyl-3,3'-diisocyanatodiphenylurea have been found particularly well suited for the purpose. It is however, also readily possible to use monomeric diisocyanates of the type used in preparing the prepolymer or diisocyanates which contain urethane groups.

The preliminary polyaddition product obtained from a polyhydroxy compound, a polyisocyanate and a glycol normally has an approximate molecular weight of 20,000–50,000.

In order better to describe and further clarify the invention, the following are specific examples thereof. In these examples, the effectiveness of the compound which splits off an amine on the reaction rate between the preliminary addition product and polyisocyanate is indicated by the amount of increase in the Mooney viscosity at 121° C. over the increase obtained under similar processing conditions but without a compound which splits off an amine. For the purpose of comparison, the Mooney viscosity after the preliminary addition product and the polyisocyanate have been mixed together for about 25 minutes is given. After five minutes' mixing the Mooney viscosity is usually about ten units regardless of whether or not the mixture contains the compound which splits off an amine.

A "standard preliminary addition product" for use in the following examples is first prepared from about 100 parts by weight of a polyester prepared from 1 mol of adipic acid and 1.1 mol of ethylene glycol and having about 1.7% hydroxyl groups. The polyester is dehydrated for about two hours at about 130° C. while stirring under a vacuum at a pressure of about 50 mm. Thereafter, the temperature is permitted to drop to about 125° C. and about 13.5 parts by weight of p-phenylene diisocyanate are added to the polyester while stirring. The temperature initially drops to about 110° C. with the addition of the diisocyanate and then rises within about ten minutes to about 130° C. About 3.5 parts by weight of 1,4-butylene glycol are then added and after thorough mixing with the isocyanate-modified polyester, the resulting mixture is poured into a hot waxed pan or other suitable mold or shaping device. After heating for about 24 hours in a heating chamber at about 110° C., the preliminary addition product has changed into a solid, raw rubber like condition and can be used for further processing with a polyisocyanate to form a high molecular polyurethane plastic.

Example 1

About 100 parts by weight of the "standard preliminary addition product" prepared according to the foregoing are mixed on a rubber mill or other suitable mixer with about six parts by weight of dimeric 2,6-toluylene diisocyanate. No compound which splits off an amine upon heating to above 50° C. is included in this mixture. The preliminary addition product and dimeric 2,6-toluylene diisocyanate are mixed together on a rubber mill. The Mooney viscosity of the mixture is about 26 units after 25 minutes' mixing at 121° C. on the rubber mill. The mixture must be placed in a cold mold when making the elastomer and then heated for about 60 minutes at 120° C. The mixture may be placed in the mold immediately after mixing or after it has been stored for a considerable length of time. After cooling to room temperature, the resulting molded product may be removed and after being kept for about 48 hours at room temperature it is heated for another 24 hours at about 110° C. in an oven or other suitable heating chamber to produce an elastomeric polyurethane.

Example 2

About 100 parts by weight of the "standard preliminary addition product" prepared above are mixed on a rubber mill with about six parts by weight of dimeric 2,6-toluylene diisocyanate under substantially the same conditions as in Example 1 except that about 0.5 part by weight zinc ethylphenyldithiocarbamate is added to the mixture. The Mooney viscosity after 25 minutes' mixing is about 51 and the heating time required in the oven at 110° C. can be reduced to about 8 hours.

If instead of adding only 0.5 part by weight zinc ethylphenyldithiocarbamate about 1.5 parts by weight of this compound are added to the mixture, the Mooney viscosity is increased to about 70 after about 25 minutes at about 121° C. on the rubber mill. The heating time required to make a suitable polyurethane can be reduced to about 30 minutes at 120° C. and to about 4 hours at 110° C.

About 0.5 part by weight of zinc dimethyldithiocarbamate or zinc diethyldithiocarbamate have about the same effect on the Mooney viscosity as about 1.5 parts by weight of zinc ethylphenyldithiocarbamate.

About 0.5 part by weight of the copper chloride complex of pyridine, quinoline or collidine instead of zinc ethylphenyldithiocarbamate results in a product having a Mooney viscosity of about 40 after 25 minutes' mixing at about 121° C.

When hexamethylenetetraamine is substituted for the zinc ethylphenyldithiocarbamate in this example, the viscosity of the preliminary addition product increases to about 75 Mooney units after mixing for about 25 minutes. If one part by weight of zinc oxide is added to the mixture containing the hexamethylenetetraamine, the Mooney viscosity is too great to be measured after only about 10 minutes' processing at 121° C. on the rubber mill.

Example 3

About 100 parts by weight of the "standard preliminary addition product" prepared according to the above procedure are mixed on the roller with about six parts by weight of dimeric 2,6-toluylene diisocyanate as in Example 1. However, about 0.5 part by weight of zinc ethylphenyldithiocarbamate and about one part by weight zinc oxide are added to the mixture. After processing on the rubber mill for about 25 minutes at about 121° C. the Mooney viscosity is increased to about 75. Final heating in the oven at 110° C. is no longer necessary and the heating time in the mold at 120° C. may be reduced to 30 minutes. By using about 1 part lead oxide instead of the zinc oxide in this example, the Mooney viscosity is increased to about 190 and the heating time required at 120° C. is only 15 minutes and heating at 110° C. is not required.

When a mixture of about 100 parts by weight of the "standard preliminary addition product" prepared according to the process described above and about six parts by weight of dimeric 2,6-toluylene diisocyanate and one part by weight zinc oxide are processed on a rubber mill without using a substance which splits off an amine, the Mooney viscosity of the mixture is thirty after 25 minutes' processing at about 121° C. and the same mixture containing one part lead oxide instead of the zinc oxide will have a Mooney viscosity of only about 40 after processing for about 25 minutes at 121° C. on the rubber mill. This indicates that neither zinc oxide nor lead oxide alone will bring about the acceleration achieved through use of a compound which splits off an amine alone or in admixture with an oxide of a heavy metal.

Example 4

About one part by weight iron oxide or titanium dioxide is added on a rubber mill to the about 100 parts by weight preliminary addition product, six parts by weight dimeric 2,6-toluylene diisocyanate and 0.5 part by weight of zinc ethylphenyldithiocarbamate. The Mooney viscosity is only increased to about 35 after processing for about 25 minutes at 121° C. Furthermore the heating time required to produce a finished product is 60 minutes at 120° C. in the mold and about fifteen hours at 110° C. in the heating chamber. This indicates that acid metal oxides such as the oxides of iron and titanium and similar metals are unsuitable for the purpose.

Example 5

A preliminary addition product is prepared under the same conditions as described above but about 4.1 parts by weight diethylene glycol are used instead of 1.5 parts by weight 1,4-butylene glycol. This preliminary product is then processed on the rubber mill using about 100 parts by weight of the polyester and about 6 parts by weight dimeric 2,6-toluylene diisocyanate. The Mooney viscosity does not increase to the point where it can be measured and an elastomeric product cannot be prepared under the conventional processing steps.

To the same preliminary product and dimeric 2,6-toluylene diisocyanate mixture is added about 1 part by weight of zinc ethylphenyldithiocarbamate and about three parts by weight of zinc oxide and this mixture is processed on a rubber mill. The Mooney viscosity after processing for about twenty five minutes at about 121° C. is about 58.

Example 6

When a preliminary addition product is prepared according to the process described above with the exception that about 15 parts by weight of toluylene diisocyanate instead of the 13.5 parts by weight of p-phenylene diisocyanate are used, the resulting product is a very soft addition product which will not yield an elastomeric product after about 6 parts by weight of dimeric 2,6-toluylene diisocyanate have been thoroughly incorporated therein by processing on the rubber mill. The Mooney viscosity does not increase to the point where it can be measured. However if about one part by weight of zinc phenylethyldithiocarbamate and about three parts by weight zinc oxide are added to this mixture, a normal elastomeric material is obtained upon processing on the rubber mill, which can be heated and molded according to the process described herein. The Mooney viscosity of the mixture after processing on the rubber mill for about twenty five minutes at about 121° C. is about 58.

Example 7

About 100 parts of a polythioether prepared by condensing thiodiglycol and 1,4-butylene glycol and having about 1.6% hydroxyl groups are reacted according to the process described above, with about 13.5 parts by weight p-phenylene diisocyanate and about 3.5 parts by weight 1,4-butylene glycol. About six parts by weight dimeric 2,6-toluylene diisocyanate are incorporated in this mixture on the rubber mill and after twenty five minutes' processing the Mooney viscosity of the mixture is about 20.

When about one part by weight of zinc dimethyldithiocarbamate is added to about 100 parts of the polythioether preliminary addition product and the dimeric 2,6-toluylene diisocyanate mixture, the Mooney viscosity of the mixture after 25 minutes' processing on a rubber mill at 121° C. is about 50.

About 1 part by weight zinc oxide and about 1 part zinc dimethyldithiocarbamate are added to the mixture of about 100 parts of the polythioether preliminary addition product above and six parts by weight dimeric 2,6-toluylene diisocyanate and the resulting mixture is processed on the rubber mill for about twenty five minutes at about 121° C. The Mooney viscosity of the mixture is about 70 and the heating time required to produce the product after complete mixing on the rubber mill is similar to that of the previous examples.

*Example 8*

About nine parts by weight of 3,3'-dimethyl-4,4'-diisocyanatophenylurea may be substituted in Examples 2 through 7 for the six parts by weight dimeric 2,6-toluylene diisocyanate and the mixture processed in substantially the same way as described above. The Mooney viscosity of the resulting mixture will be on the average about one third lower and the heating time about one third longer than that required with the mixtures above, but this is an improvement over the heretofore available preliminary addition products and such a mixture has many advantages for some purposes. A high molecular weight elastomeric product which can be worked under conditions similar to those used to process the foregoing and a product having similar physical properties is derived.

*Example 9*

About 6 parts by weight of 4,4'-diphenylmethanediisocyanate may be substituted in Examples 2 through 7 for the 6 parts by weight of dimeric 2,6-toluylene diisocyanate and the mixture processed in substantially the same way as described above. The Mooney viscosity of the resulting mixture will be on the average about 25% lower and the heating time about 25% longer than that required with the mixtures above. But this is an improvement over the heretofore available preliminary addition products and such a mixture has many advantages for some purposes. A high molecular weight elastomeric product which can be worked under conditions similar to those used to process the foregoing and a product having similar physical properties is derived.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for making an elastomeric polyurethane which comprises first preparing a preliminary addition product by a process comprising reacting a polyhydroxyl compound selected from the group consisting of polyesters prepared from a glycol and polycarboxylic acids, poly(alkylene ether) glycols and polythioether glycols, said polyhydroxyl compound having a molecular weight of at least about 1000, an hydroxyl number of from about 20 to about 112 and an acid number of not more than 2, with an excess of an organic diisocyanate and then reacting the resulting isocyanate-terminated adduct with a polyhydric alcohol having not more than about 14 carbon atoms and having from 2 to 3 alcoholic hydroxyl groups as its sole terminal groups reactive with an isocyanate to produce a product having terminal hydroxyl groups and then reacting the thus produced preliminary addition product with additional organic diisocyanate while in admixture with a precursor of an amine adapted to split off an amine when heated to a temperature above 50° C., said precursor being selected from the group consisting of zinc salts of substituted dithiocarbamic acids, and metal salts of alkyl-substituted pyridines, quinaldines, and acridines, said metal salts being selected from the group consisting of copper, zinc, lead, ferrous, calcium, cobalt, nickel and ferrocyanic acid.

2. The method of claim 1 wherein said metal salt is the copper salt.

3. The method of claim 1 wherein said precursor of an amine is zinc ethyl phenyl dithiocarbamate.

References Cited in the file of this patent

UNITED STATES PATENTS

| | | |
|---|---|---|
| 2,621,166 | Schmidt et al. | Dec. 9, 1952 |
| 2,702,797 | Rugg | Feb. 22, 1955 |
| 2,779,689 | Reis | Jan. 29, 1957 |
| 2,801,990 | Seeger et al. | Aug. 6, 1957 |
| 2,836,575 | Jones et al. | May 27, 1958 |
| 2,850,476 | Seeger et al. | Sept. 2, 1958 |
| 2,886,555 | Bunge et al. | May 12, 1959 |

FOREIGN PATENTS

| | | |
|---|---|---|
| 712,053 | Great Britain | July 14, 1954 |
| W7574 | Germany | June 7, 1956 |
| 138,258 | Australia | Aug. 9, 1950 |
| 1,116,218 | France | Jan. 30, 1956 |